United States Patent
Blumentritt

(10) Patent No.: US 10,384,657 B2
(45) Date of Patent: Aug. 20, 2019

(54) METHOD AND CONTROL DEVICE FOR SELF-BRAKING A MOTOR VEHICLE

(71) Applicant: VOLKSWAGEN AG, Wolfsburg (DE)

(72) Inventor: Marc Blumentritt, Braunschweig (DE)

(73) Assignee: Volkswagen AG (DE)

( * ) Notice: Subject to any disclaimer, the term of this patent is extended or adjusted under 35 U.S.C. 154(b) by 179 days.

(21) Appl. No.: 15/409,679

(22) Filed: Jan. 19, 2017

(65) Prior Publication Data
US 2017/0210358 A1  Jul. 27, 2017

(30) Foreign Application Priority Data
Jan. 21, 2016  (DE) .......................... 10 2016 200 853

(51) Int. Cl.
  *B60T 7/22* (2006.01)
  *B60T 8/172* (2006.01)
  *B60T 13/74* (2006.01)

(52) U.S. Cl.
  CPC .............. *B60T 7/22* (2013.01); *B60T 8/172* (2013.01); *B60T 13/746* (2013.01); *B60T 2201/022* (2013.01); *B60T 2201/12* (2013.01); *B60T 2210/32* (2013.01); *B60T 2220/04* (2013.01)

(58) Field of Classification Search
  CPC .......... B60T 7/22; B60T 13/746; B60T 8/172; B60T 2220/04; B60T 2210/32; B60T 2201/022; B60T 2201/12
  See application file for complete search history.

(56) References Cited

U.S. PATENT DOCUMENTS

| | | | |
|---|---|---|---|
| 8,930,105 B2 * | 1/2015 | Cetinkaya | B60T 7/22 180/274 |
| 2011/0155496 A1 * | 6/2011 | Baumann | B60R 21/0134 180/282 |
| 2012/0200147 A1 * | 8/2012 | Endo | B60T 8/38 303/3 |
| 2013/0166150 A1 | 6/2013 | Han et al. | |

(Continued)

FOREIGN PATENT DOCUMENTS

| DE | 10220567 A1 | 11/2003 |
|---|---|---|
| DE | 102005002760 A1 | 8/2005 |

(Continued)

OTHER PUBLICATIONS

Search Report for German Patent Application No. 10 2016 200 853.6; dated Nov. 23, 2016.

*Primary Examiner* — Mary Cheung
(74) *Attorney, Agent, or Firm* — Barnes & Thornburg LLP

(57) ABSTRACT

A method for controlling self-braking of a motor vehicle wherein a collision detection device predicts an imminent collision and determines for the self-braking a TTB braking time at which the self-braking is to start, and a brake system is operated in a standby state in which the brake system reacts to a braking request of the collision detection device with activation of wheel brakes of the motor vehicle, wherein the brake system requires a dead travel time to generate for the first time a braking torque by the wheel brakes starting from the standby state, for the self-braking. The method provides that a time period value of the dead travel time is made available in the motor vehicle, and the wheel brakes are activated at a starting time when the imminent collision is detected.

24 Claims, 2 Drawing Sheets

(56) References Cited

U.S. PATENT DOCUMENTS

| | | | |
|---|---|---|---|
| 2014/0067220 A1* | 3/2014 | Seiler | B60T 7/12 |
| | | | 701/70 |
| 2014/0277981 A1* | 9/2014 | Svensson | B60T 7/042 |
| | | | 701/70 |
| 2015/0158471 A1* | 6/2015 | Ezoe | B60T 7/22 |
| | | | 701/70 |
| 2015/0191083 A1 | 7/2015 | Boss et al. | |
| 2015/0360665 A1* | 12/2015 | Svensson | B60T 13/745 |
| | | | 701/70 |
| 2017/0113666 A1* | 4/2017 | Xu | B60Q 9/008 |

FOREIGN PATENT DOCUMENTS

| | | |
|---|---|---|
| DE | 102004058663 A1 | 6/2006 |
| DE | 102007049249 A1 | 4/2008 |
| DE | 102010008208 A1 | 8/2011 |
| DE | 102011106520 A1 | 12/2011 |
| DE | 102011012784 A1 | 3/2012 |
| DE | 102010049351 A1 | 4/2012 |
| DE | 102012215952 A1 | 3/2014 |
| DE | 102013007543 A1 | 11/2014 |
| DE | 102013225804 A1 | 6/2015 |
| EP | 1889765 A1 | 2/2008 |
| WO | 2006072342 A1 | 7/2006 |
| WO | 2011069489 A1 | 6/2011 |
| WO | 2014040855 A1 | 3/2014 |
| WO | 2015009217 A1 | 1/2015 |

\* cited by examiner

METHOD AND CONTROL DEVICE FOR SELF-BRAKING A MOTOR VEHICLE

PRIORITY CLAIM

This patent application claims priority to German Patent Application No. 10 2016 200 853.6, filed 21 Jan. 2016, the disclosure of which is incorporated herein by reference in its entirety.

SUMMARY

Illustrative embodiments relate to a control device and to a method for controlling self-braking of a motor vehicle. The self-braking can be initiated in a known state by a collision detection device which predicts an imminent collision of the motor vehicle and, in response, requests activation of wheel brakes in a brake system of the motor vehicle. Illustrative embodiments also relate to a motor vehicle having the disclosed control device.

BRIEF DESCRIPTION OF THE DRAWINGS

An exemplary embodiment will be described below. In this respect.

DETAILED DESCRIPTION

Figure 1:
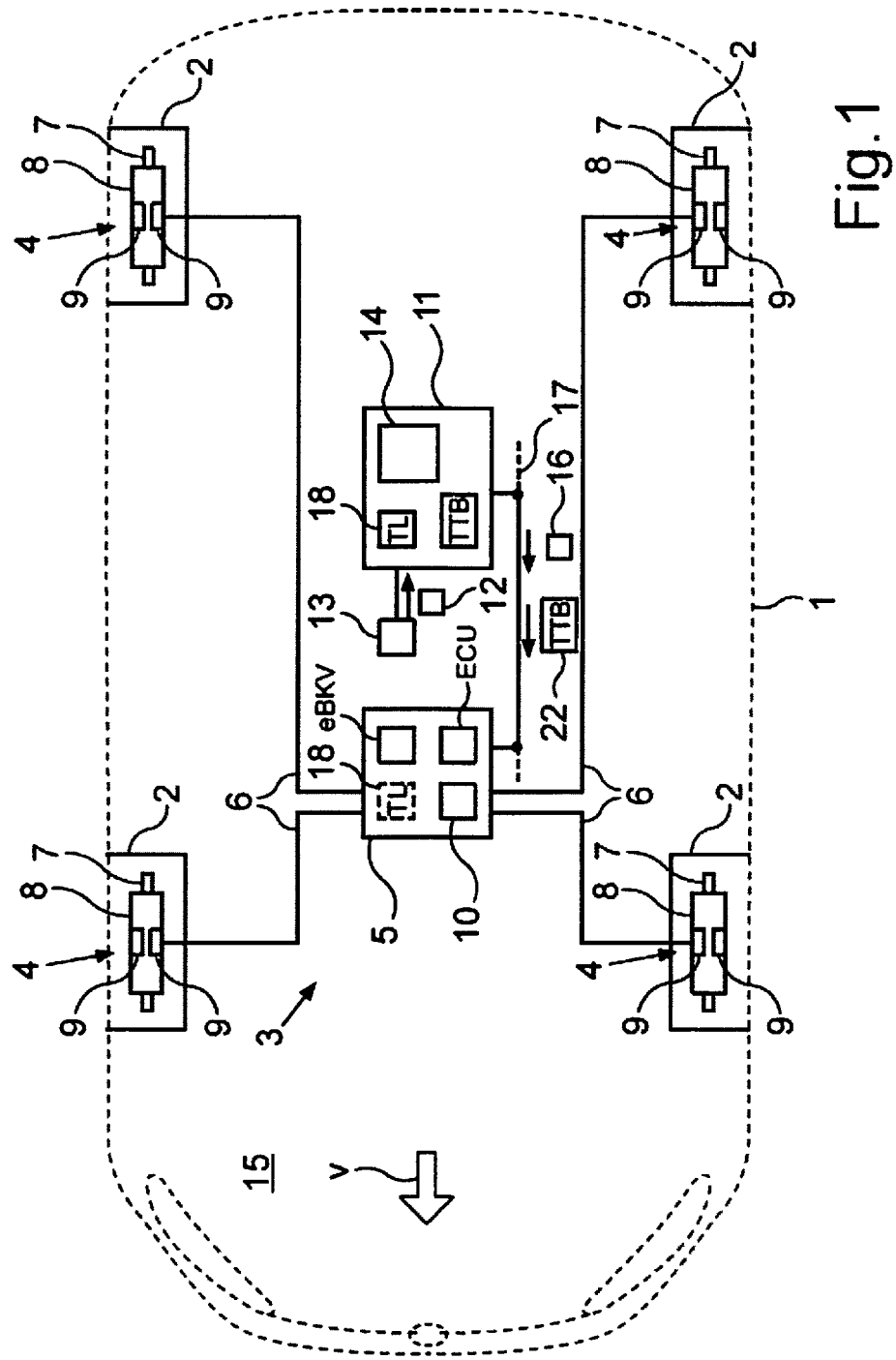
FIG. 1 shows a schematic illustration of an embodiment of the motor vehicle.

The disclosed method provides emergency braking assistance. Emergency braking assistants require that brake systems implement strong decelerations (negative acceleration) for emergency braking or self-braking if the driver of the motor vehicle does not react, or reacts with insufficient braking force, to a detected object in the surroundings of the vehicle. However, every brake system has a dead travel time at the start of the buildup of a vehicle deceleration. To reduce this dead travel time, an emergency braking assistant can already request preparation or conditioning of the brake system before the requesting of the actual self-braking so that the brake system subsequently reacts to the braking request with the shortest possible dead travel time. For example, brake linings can be positioned closer to the brake disk and held there. As a result of the conditioning, the brake system is moved from its standby state into an active state.

The essential drawback of this procedure is that the dead travel time of brake systems in response to braking requests is of different lengths depending on the technology used. To determine the ideal time of the preparation of the brake system, the emergency braking assistance must therefore have a wide ranging understanding of the brake system itself. However, this is not normally the case in practice, since in a motor vehicle brake systems from different manufacturers may be installed. Therefore, in previous solutions within an emergency braking assistant the time for the optimum preparation of the brake system can only be predicted imprecisely, which can lead to losses in terms of brake travel or to premature braking interventions.

Collision detection devices are known in the prior art, for example, from DE 10 2010 049 351 A1. The braking assistance device, described therein, for collision detection makes available an assistance function in the absence of driver activity and as a function of the distance between the motor vehicle and an object located in front of the motor vehicle. The braking assistance device can be coupled to a brake system via a CAN (Controller Area Network) bus, to emit a deceleration request to the latter. The deceleration request triggers a braking intervention of the brake system.

WO 2011/069489 A1 discloses an emergency braking assistance system for assisting a driver when starting. A detection device determines a time to the collision, referred to as the TTC (Time To Collision) from data from a surroundings sensor system, and a time until the necessary starting of a required braking maneuver, referred to as the TTB (Time To Brake), to avoid an imminent collision with the vehicle driving ahead. On the basis of the latter, a corresponding braking intervention signal can be generated from an autonomous, rapid and chronologically limited braking intervention by an electronic brake system and output to the brake system.

The disclosed embodiments reduce the influence of the dead travel time of the brake system in the case of self-braking during the interaction of a collision detection device and a brake system.

Disclosed embodiments provide a method for controlling emergency braking or self-braking of a motor vehicle. The method coordinates an interaction between a collision detection device and a brake system of the motor vehicle. In the method, the collision detection device predicts an imminent collision of the motor vehicle and determines for the self-braking a braking time, referred to here as a TTB braking time (Time To Brake). The self-braking is to start at the TTB braking time, that is to say if possible a braking torque is generated at the wheels of the motor vehicle for the first time for the self-braking. The brake system is operated in a standby state in which it reacts to a braking request of the collision detection device with activation of the wheel brakes of the motor vehicle. The braking request can predefine, for example, a setpoint deceleration, that is to say a negative setpoint acceleration, which is to be brought about by the brake system by means of the wheel brakes. To transmit the braking request from the collision detection device to the brake system, these two devices can be coupled, for example, via a communication bus, for example, via a CAN bus.

The standby state is the normal operating state which the brake system has after the switching on of the motor vehicle. To be able to generate a braking torque for the first time from the standby state, the brake system requires a dead travel time to generate for the first time a braking torque by means of the wheel brake for the self-braking which is requested by the braking request.

To take into account this dead travel time, the disclosed embodiments make available a time period value of the dead travel time of the brake system in the motor vehicle. In other words, a time indication, such as the time period value, is made available, for example, as a digital value, to the brake system which is actually installed in the motor vehicle. When the imminent collision is detected, the wheel brakes are then firstly not activated at the TTB braking time from the standby state of the brake system, but instead are already activated at a starting time which corresponds to the TTB braking time minus the time period value of the dead travel time. The disclosed method does not start the activation of the wheel brakes only at the TTB braking time but already in advance of the starting time so that the wheel brakes are actuated or activated form the standby state. Since in this context the dead travel time is initially required to generate at all a braking torque at the wheel brakes for the first time, the described definition of the starting time results in a situation in which at the TTB braking time a braking torque is actually generated by the wheel brakes for the first time. On the basis of the disclosed method, it is therefore possible to compensate completely or avoid the influence of the dead travel time.

Disclosed embodiments provide optional developments, the features of which result in additional benefits.

Two developments relate to the question as to which of the two devices, the collision detection device or the brake system, takes into account the time period value of the dead travel time. One of these developments provides that the self-braking is started by the collision device emitting its braking request at the starting time. Here, the collision detection device therefore takes into account the time period value by not emitting the braking request to the brake system only at the TTB braking time but rather already earlier at the starting time. The brake system does not have to be specifically configured to carry out the disclosed method but rather can react in the manner known per se to the braking request from the standby state by activating the wheel brakes, wherein the method may then require the dead travel time, since, of course, the braking request has already arrived before the actual TTB braking time at the starting time.

The alternative development provides for this purpose that the self-braking is started by the collision detection device signaling the TTB braking time to the brake system before the actual braking request, and the brake system itself determining the starting time and then starting to activate the wheel brakes at the starting time without the braking request. In other words, the collision detection device informs the brake system as to when the next braking request will arrive. With this development, the brake system itself cannot take into account its own dead travel time. As a result, a current operating state of the brake system which influences the time period value of the dead travel time can also be taken into account.

There is an additional refinement of this development which takes into account the fact that under certain circumstances the braking request fails to occur because the collision detection device has, for example, detected that self-braking is no longer necessary. In this development, the braking system aborts the self-braking when the braking request fails to occur at the TTB braking time. This prevents a braking torque being generated by the brake system even though no braking request is present.

As already stated, the dead travel time is that phase during which the brake system is changed from the standby state into the state in which a braking torque is actually generated at the wheels of the motor vehicle by means of the wheel brakes. In the standby state, for example, brake blocks or brake linings of the wheel brakes can be arranged in a position of rest. Starting from this position of rest, the brake linings are then moved, for example, toward a respective brake disk or accelerated toward the latter during the dead travel time. The dead travel time is then generated at the end or the friction is generated when the brake linings reach or touch the brake disk. In other words, according to at least one disclosed embodiment, during the dead travel time brake linings of the wheel brakes are accelerated from a position of rest toward brake disks of the wheel brakes.

The brake linings may be kept moving at the TTB operating time. Then, that time which is necessary to accelerate the brake linings to increase the pressure force of the brake linings against the brake disks is also eliminated.

At least one disclosed embodiment provides that during the dead travel time a pump starts running to make available a brake pressure for the self-braking. Additionally or alternatively, for this purpose there is provision to accelerate a brake piston of an electromechanical brake booster. As a result, the response time is reduced or the pressure build-up speed with which the brake pressure is increased by the brake system to carry out the self-braking is increased.

With respect to the actual prediction of the TTB braking time, one development provides that the collision detection device predicts or forecasts a collision time of the collision on the basis of a digital map of the surroundings. This collision time is referred to here as TOC (Time To Collision) collision time, as is customary in the prior art. From the TOC collision time, the TTB braking time is determined as that time at which the self-braking must start at the latest, that is to say the first time a braking torque has to be generated by the brake system to avoid the collision by means of the self-braking, or at least to limit it to a predetermined degree of damage in that, e.g., a predetermined maximum speed is undershot. For example, the collision detection device can predict that a collision takes place in two seconds. Then, for example, the current time plus one second can be defined as the TTB braking time. If the dead travel time is 700 milliseconds, it is then possible by means of the disclosed method to activate the wheel brake after 300 milliseconds starting from the current time, with the result that the wheel brakes actually therefore produce a braking torque for the first time for this braking maneuver after one second, that is to say at the TTB braking time.

As already stated, the disclosed embodiments also include a control device for a motor vehicle, by means of which control device an embodiment of the disclosed method can be carried out. The control device is configured to determine, for a self-braking operation, a starting time from which the brake system activates, from a standby state, wheel brakes of the motor vehicle (brake linings in the position of rest and/or pump for making available a brake pressure deactivated or in a state of rest and/or brake piston of the brake booster at rest) on the basis of a TTB braking time and a time period value of a dead travel time of a brake system of the motor vehicle. The control device is also configured to already activate the wheel brakes from the starting time, that is to say not only at the TTB braking time, with the result that at the TTB braking time the wheel brakes just start to generate a braking torque, and at the same time are also already dynamically moving. The control device is configured for this purpose to carry out an embodiment of the disclosed method.

Finally, the disclosed embodiments also include a motor vehicle having a brake system and a collision detection device. The brake system and the collision detection device can be fundamentally based on a corresponding device from the prior art. According to the disclosed embodiments, the brake system and/or the collision detection device can be developed in such a way that they make available a disclosed control device. In the way described, either the collision detection device or the brake system (or also a combination of the two) determines, on the basis of a time period value of the dead travel time, a starting time for the activation of the wheel brakes, and in the case of a predicted collision the wheel brakes are already activated for the self-braking at the starting time instead of only at the TTB braking time.

The disclosed motor vehicle may be configured as a motor car, for example, as a passenger car or truck.

An exemplary embodiment is explained below. In the exemplary embodiment, the described components of the embodiment each constitute individual features which are to be considered independently of one another and which each also develop independently of one another, and therefore are also to be considered components, either individually or in any other combination than that shown. Furthermore, the described embodiment can also be supplemented by further features already described.

Functionally identical elements are each provided with the same reference symbols in the figures.

FIG. 1 shows a motor vehicle 1 which can be, for example, a motor car, i.e., a passenger car, or truck. The motor vehicle 1 can have wheels 2 at which a braking torque for reducing a velocity V of the motor vehicle 1 can be generated by means of a brake system 3. The brake system 3 can for this purpose have wheel brakes 4. Furthermore, the brake system 3 can have, for example, a control unit 5 with a brake control unit ECU and an electronic brake booster eBKV. The brake control unit ECU can control, for example, the electronic brake booster eBKV of the control unit 5, as a result to adjust the hydraulic brake pressure in the brake circuit 6. To generate the brake pressure, the control unit 5 can comprise, for example, a hydraulic pump 10. The specified elements could be made available, e.g., by an electronic stability control (ESC).

Each wheel brake 4 can have a brake disk 7 and a brake caliper 8 with brake linings 9, wherein the brake linings 9 can be pressed against the brake disk 7 in a known state by means of the control unit 5 via the brake circuit 6.

The motor vehicle 1 can also have a collision detection device 11 which can be implemented, for example, on the basis of a processor device, for example, a microprocessor or microcontroller. The collision detection device 11 can generate, for example, a digital map 14 of the surroundings or vehicle surroundings 15 of the motor vehicle 1 on the basis of sensor data 12 of a sensor device 13 and determine therefrom whether a collision of the motor vehicle 1 with an external object is imminent. For this case, the collision detection device 11 can emit a braking request 16 to the brake system 3.

The braking request 16 can be transmitted, for example, as a digital message, to the brake system 3 via a bus system 17, for example, a CAN bus. The brake system 3 then generates, by means of the wheel brakes 4 as a function of the request signal 16, the described braking torque to reduce the velocity V. As a result, the interaction of the collision detection device 11 and of the brake system 3 brings about self-braking of the motor vehicle 1 without involvement of the driver of the motor vehicle 1.

In the case of the motor vehicle 1 it is ensured here that the generation of the braking torque, that is to say the reduction in speed, starts at a TTB braking time, that is to say a TTB (Time To Brake), calculated by the collision detection device 11, even though firstly a dead travel time TL must pass starting from a standby state of the brake system to move the brake linings 9 from the standby state against the brake disks 7 and/or to generate a sufficiently large brake pressure in the brake circuit 6.

For this purpose, the motor vehicle 1 can be configured in one of two embodiments described below. Generally, a time value 18 of the dead travel time TL is made available in the collision detection device 11 and/or brake system 3, and this time value 18 is taken into account during the actuation or activation of the wheel brakes 4.

Figure 2:
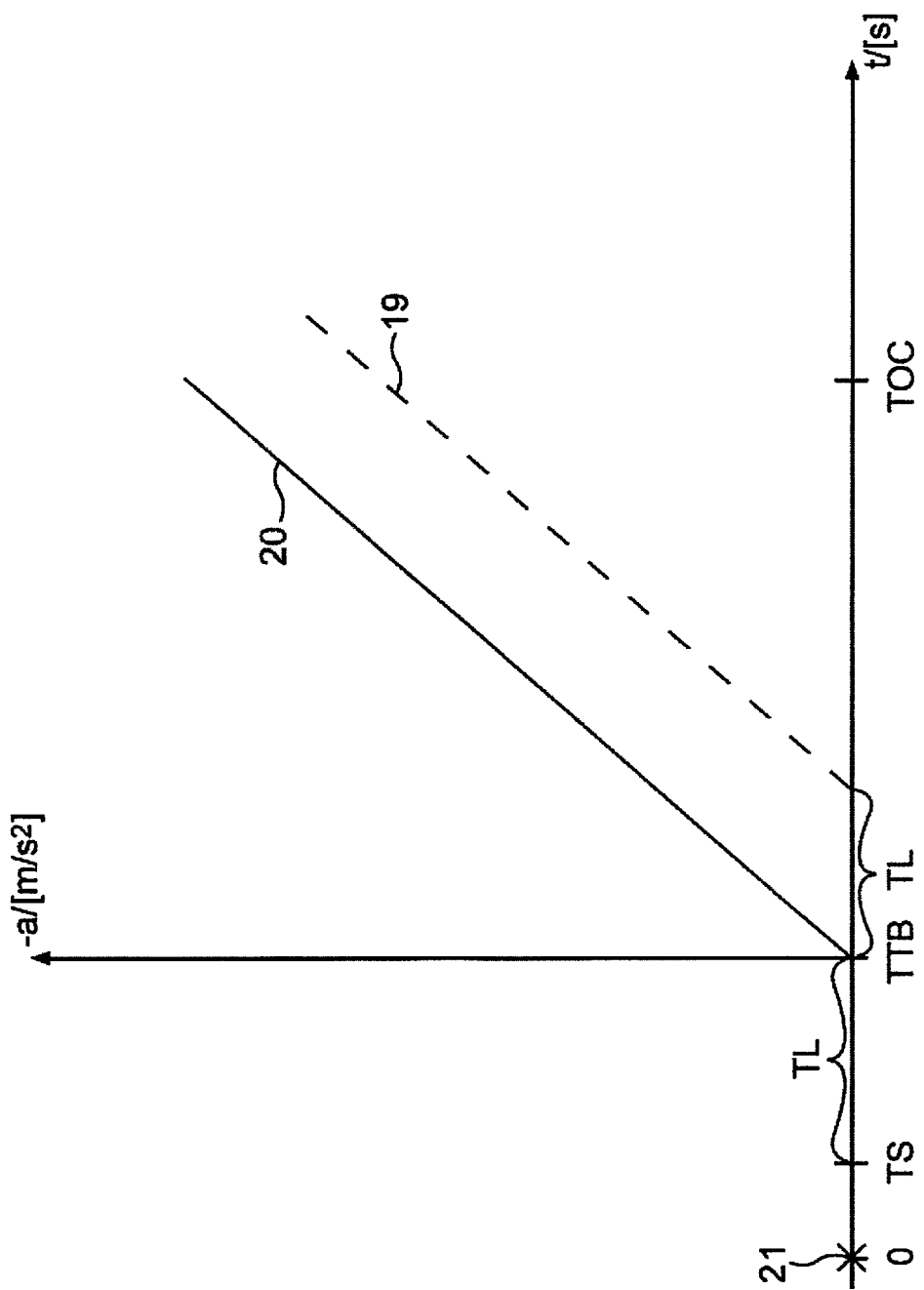
FIG. 2 shows a diagram with schematic time profiles of a vehicle deceleration, such as can arise as a result of self-braking in the case of the motor vehicle in FIG. 1.

This is explained in more detail below with reference to FIG. 2. FIG. 2 shows time profiles 19, 20 of the vehicle deceleration −a ("minus a"), that is to say the negative acceleration a, by which the velocity V of the motor vehicle 1 is reduced on the basis of the braking torque. The profiles are plotted against the time t.

The case known from the prior art is represented by the time profile 19. The collision detection device 11 emits the braking request 16 at the desired TTB braking time TTB. The brake system 3 subsequently generates, in the brake linings 9, the brake pressure by which the brake linings 9 are moved up to the brake disks 7 and then pressed against the brake disks 7. Therefore, the dead travel time TL elapses starting from the position of rest of the brake linings 9 through which the braking torque is generated, with the result that the dead travel time TL elapses from the desired TTB braking time up to the first deceleration of the motor vehicle 1, and the time profile 19 of the vehicle deceleration −a occurs only from then.

According to at least one disclosed embodiment, starting from a current time 21 the collision detection device 11 can then emit the braking request 16 to the brake system 3 at a starting time TS. The starting time TS is obtained as the TTB braking time minus the time value 18 of the dead travel time TL. The brake system 3 can therefore react to the braking request 16 in the conventional way. Since the dead travel time TS firstly elapses up to the first time the braking torque is generated, the braking torque is therefore generated firstly at the TTB braking time and from then on it is increased continuously as a result of further pressing of the brake linings 9 against the brake disks 7, with the result that the time profile 20 is obtained. The TTB braking time can be determined by the collision detection device in a manner known per se from a collision time TOC, for example, on the basis of the digital map 14 of the surroundings and the current velocity V.

As an alternative to the described emission of the braking request 16 at the starting time TS, the collision detection device 11 can also communicate the TTB braking time to the brake system 3 in an advance message 22. The brake system 3, for example, the brake control unit ECU, can then itself calculate the starting time TS on the basis of the advance message 22 with the information about the TTB braking time, and start with the activation of the wheel brakes 4 at the starting time TS even though no braking request 16 has yet been received. For this purpose, the time value 18 of the dead travel time TL is to be made available in the collision detection device 11. If the braking request 16 then arrives in the brake system 3 at the TTB braking time from the collision detection device 11, the brake linings 9 are already in motion and in fact just touch the brake disks 7. This also results in the time profile 20 of the vehicle deceleration.

In the case of the motor vehicle 1, it is therefore left up to the collision detection device 11 or the brake system 3 to determine when the brake system is pre-conditioned for emergency braking or self-braking. For this purpose, the time value 18 for the dead travel time TL is correspondingly made available, and on the basis of the TTB braking time at which the emergency braking is to start the starting time TS is determined either by the collision detection device 11 or the brake system 3. At the starting time TS, the braking request 16 can then either be emitted prematurely by the collision device, or the TTB braking time can be communicated as an advance message 22 to the brake system 3, with the result that the brake system 3 can pre-condition itself.

In this case the following sequence is then obtained:
1. The emergency braking assistant, that is to say the collision detection device 11, monitors the objects in the surroundings 15 of the vehicle. If a collision course with an object is detected, a Time-To-Collision TOC is calculated.

2. The Time-To-Brake TTB is derived as a TTB braking time from this TOC by the emergency braking assistant, and transmitted in the advance message 22 to the brake system 3, for example, via the databus 17.
3. The brake system determines, starting from the reception of the TTB braking time on the basis of its specified system properties, the ideal time for the preparation (conditioning) of the brake system 3, for example, for a start-up of the hydraulic pump 10 and/or a start-up of the eBKV braking piston. The decisive system property here is the time value 18 of the dead travel time TL. The ideal time is the starting time TS.
4. The pre-conditioning needs to be configured on the part of the brake system 3 in such a way that the buildup of the requested vehicle deceleration can start from the time when the TTB braking time is reached, without a delay.
5. Starting from the time when the TTB braking time is reached, the emergency braking assistant requests, by means of the brake request 16, the setpoint deceleration which is to be set.

To apply the reduction of the dead travel time TL in the brake system 3 in emergency braking operations by communicating the TTB braking time, the following system may be installed in the motor vehicle 1:
1. A control unit for the emergency braking assistant, that is to say the collision detection device 11 which is configured with suitable sensors (for example, front-mounted radar, camera) of the sensor device 13 for detecting objects and measuring the TOC and for calculating the TTB braking time.
2. A brake system 3 with active braking torque build-up (which can be controlled via the brake control unit ECU), that is to say, for example, with an eBKV, and a controller of the emergency braking for setting the setpoint deceleration according to the braking request 16.

Overall, the example shows how the disclosed embodiments can be used in a brake system in a motor vehicle to reduce a dead travel time of the brake system by communicating the planned braking time in the case of emergency braking operations.

LIST OF REFERENCE SYMBOLS

1 Motor vehicle
2 Wheel
3 Brake system
4 Wheel brake
5 Control unit
6 Hydraulic brake circuit
7 Brake disk
8 Brake caliper
9 Brake lining
10 Hydraulic pump
11 Collision detection device
12 Sensor data
13 Sensor device
14 Digital map of the surroundings
15 Surroundings of the vehicle
16 Braking request
17 Communication device
18 Time period value
19 Time profile
20 Time profile
21 Current time
22 Advance message ECU Brake control unit
eBKV Brake booster
TOC Collision time
TTB TTB braking time
V Velocity

The invention claimed is:
1. A method for controlling self-braking of a transportation vehicle, the method comprising:
predicting an imminent collision of the transportation vehicle by a collision detection device;
determining, for the self-braking, a braking time at which the self-braking is to start;
operating a brake system in a standby state in which the brake system reacts to a braking request of the collision detection device with activation of wheel brakes of the transportation vehicle, wherein, for the self-braking requested by the braking request, the brake system requires a dead travel time to generate, for the first time, a braking torque by the wheel brakes starting from the standby state; and
activating the wheel brakes from the standby state of the brake system at a starting time in response to the imminent collision being predicted, wherein the starting time corresponds to the braking time minus the time period value of the dead travel time.

2. The method of claim 1, wherein the self-braking is started in response to the collision detection device emitting the braking request at the starting time.

3. The method of claim 1, wherein the self-braking is started in response to the collision detection device signaling the braking time to the brake system before the braking request, and the brake system starting to activate the wheel brakes at the starting time without the braking request.

4. The method of claim 3, wherein the brake system aborts the self-braking in response to the braking request failing to occur at the braking time.

5. The method of claim 1, further comprising, during the dead travel time, accelerating the brake linings of the wheel brakes from a position of rest toward brake disks of the wheel brakes.

6. The method of claim 1, wherein the brake linings are kept moving at the braking time.

7. The method of claim 1, further comprising, during the dead travel time, starting a pump to make available a brake pressure for the self-braking, and/or a brake piston of an electromechanical brake booster.

8. The method of claim 1, wherein a collision time of the collision is predicted by the collision detection device based on a digital map of the surroundings, and the method further comprises determining the braking time at which the self-braking must start at the latest, to avoid the collision or to limit the collision to a predetermined degree of damage.

9. A control device for a transportation vehicle, wherein the control device:
operates a brake system in a standby state in which a brake system of the transportation vehicle reacts to a braking request issued by a collision detection device of the transportation vehicle, by activation of wheel brakes of the transportation vehicle, wherein, for the self-braking requested by the braking request, the brake system requires a dead travel time to generate, for the first time, a braking torque by the wheel brakes starting from the standby state; and
activates the wheel brakes from the standby state of the brake system at a starting time in response to the imminent collision issued by the collision detection device of the transportation vehicle, wherein the starting time corresponds to a determined braking time, which is a time at which self-braking is to start, minus the time period value of the dead travel time.

10. The control device of claim 9, wherein the self-braking is started in response to the collision detection device emitting the braking request at the starting time.

11. The control device of claim 9, wherein the self-braking is started in response to the collision detection device signaling the braking time to the brake system before the braking request, and the brake system starting to activate the wheel brakes at the starting time without the braking request.

12. The control device of claim 11, wherein the brake system aborts the self-braking in response to the braking request failing to occur at the braking time.

13. The control device of claim 9, wherein, during the dead travel time, the control device controls acceleration of the brake linings of the wheel brakes from a position of rest toward brake disks of the wheel brakes.

14. The control device of claim 9, wherein the brake linings are kept moving at the braking time.

15. The control device of claim 9, wherein, during the dead travel time, a pump is started to make available a brake pressure for the self-braking, and/or a brake piston of an electromechanical brake booster.

16. The control device of claim 9, wherein a collision time of the collision is predicted by the collision detection device based on a digital map of the surroundings, and the method further comprises determining the braking time at which the self-braking must start at the latest, to avoid the collision or to limit the collision to a predetermined degree of damage.

17. A transportation vehicle comprising:
a brake system;
a collision detection device that predicts an imminent collision of the transportation vehicle by a collision detection device; and
a control device that:
operates the brake system in a standby state in which a brake system of the transportation vehicle reacts to a braking request issued by the collision detection device of the transportation vehicle, by activation of wheel brakes of the transportation vehicle, wherein, for the self-braking requested by the braking request, the brake system requires a dead travel time to generate, for the first time, a braking torque by the wheel brakes starting from the standby state; and
activates the wheel brakes from the standby state of the brake system at a starting time in response to the imminent collision issued by the collision detection device of the transportation vehicle, wherein the starting time corresponds to a determined braking time, which is a time at which self-braking is to start, minus the time period value of the dead travel time.

18. The transportation vehicle of claim 17, wherein the self-braking is started in response to the collision detection device emitting the braking request at the starting time.

19. The transportation vehicle of claim 17, wherein the self-braking is started in response to the collision detection device signaling the braking time to the brake system before the braking request, and the brake system starting to activate the wheel brakes at the starting time without the braking request.

20. The transportation vehicle of claim 19, wherein the brake system aborts the self-braking in response to the braking request failing to occur at the braking time.

21. The transportation vehicle of claim 17, wherein, during the dead travel time, the control device controls acceleration of the brake linings of the wheel brakes from a position of rest toward brake disks of the wheel brakes.

22. The transportation vehicle of claim 17, wherein the brake linings are kept moving at the braking time.

23. The transportation vehicle of claim 17, wherein, during the dead travel time, a pump is started to make available a brake pressure for the self-braking, and/or a brake piston of an electromechanical brake booster.

24. The transportation vehicle of claim 17, wherein a collision time of the collision is predicted by the collision detection device based on a digital map of the surroundings, and the method further comprises determining the braking time at which the self-braking must start at the latest, to avoid the collision or to limit the collision to a predetermined degree of damage.

* * * * *